United States Patent
Gratzer

(10) Patent No.: US 9,434,470 B2
(45) Date of Patent: Sep. 6, 2016

(54) SPLIT SPIROID

(71) Applicant: Aviation Partners, Inc., Seattle, WA (US)

(72) Inventor: Louis B. Gratzer, Seattle, WA (US)

(73) Assignee: Aviation Partners, Inc., Seattle, WA (US)

( * ) Notice: Subject to any disclaimer, the term of this patent is extended or adjusted under 35 U.S.C. 154(b) by 63 days.

(21) Appl. No.: 14/719,925

(22) Filed: May 22, 2015

(65) Prior Publication Data
US 2016/0159467 A1     Jun. 9, 2016

Related U.S. Application Data

(62) Division of application No. 13/493,915, filed on Jun. 11, 2012, now Pat. No. 9,038,963.

(60) Provisional application No. 61/495,236, filed on Jun. 9, 2011.

(51) Int. Cl.
*B64C 23/06*       (2006.01)

(52) U.S. Cl.
CPC .................................. *B64C 23/065* (2013.01)

(58) Field of Classification Search
CPC .................................................... B64C 23/065
See application file for complete search history.

(56) References Cited

U.S. PATENT DOCUMENTS

| | | | |
|---|---|---|---|
| 994,968 A * | 6/1911 | Barbaudy | B64C 3/14 244/35 R |
| 1,050,222 A | 1/1913 | McIntosh | |
| 1,692,081 A | 11/1928 | De La Cierva | |
| 1,710,673 A | 4/1929 | Bonney | |
| 1,841,921 A | 1/1932 | Spiegel | |
| 2,123,096 A | 7/1938 | Charpentier | |
| 2,576,981 A | 12/1951 | Vogt | |
| 2,775,419 A | 12/1956 | Hlobil | |
| 2,805,830 A | 9/1957 | Zborowski | |
| 2,846,165 A | 8/1958 | Axelson | |
| 3,029,018 A | 4/1962 | Floyd, Jr. | |
| 3,128,371 A | 4/1964 | Spaulding et al. | |
| 3,270,988 A | 9/1966 | Cone, Jr. | |
| 3,778,926 A | 12/1973 | Gladych | |
| 4,017,041 A | 4/1977 | Nelson | |

(Continued)

FOREIGN PATENT DOCUMENTS

| | | |
|---|---|---|
| CN | 101596934 A | 12/2009 |
| DE | 2149956 A1 | 4/1973 |

(Continued)

OTHER PUBLICATIONS

Boeing MD-80 Technical Specification, May 2011.

(Continued)

*Primary Examiner* — Justin Benedik
(74) *Attorney, Agent, or Firm* — Rutan & Tucker, LLP

(57) ABSTRACT

The spiroid wing tip according to embodiments of the invention including a continuous segmental assembly having a closed loop frontal profile comprising a lower near vertical segment, a horizontal segment, a vertical segment, a second horizontal upper segment, and a near vertical segment. Accordingly to some embodiments of the invention, the spiroid profile is lowered with respect to the wing chord plane, such that a portion of the spiroid wing tip extends below the wing chord plane.

17 Claims, 6 Drawing Sheets

(56) References Cited

U.S. PATENT DOCUMENTS

| | | | |
|---|---|---|---|
| 4,093,160 A | 6/1978 | Reighart, II | |
| 4,108,403 A | 8/1978 | Finch | |
| 4,172,574 A | 10/1979 | Spillman | |
| 4,190,219 A | 2/1980 | Hackett | |
| 4,205,810 A | 6/1980 | Ishimitsu | |
| 4,240,597 A | 12/1980 | Ellis et al. | |
| 4,245,804 A | 1/1981 | Ishimitsu et al. | |
| 4,247,062 A | 1/1981 | Brueckner | |
| D259,554 S | 6/1981 | Parise et al. | |
| 4,365,773 A | 12/1982 | Wolkovitch | |
| 4,429,844 A | 2/1984 | Brown et al. | |
| 4,444,365 A | 4/1984 | Heuberger | |
| 4,541,593 A | 9/1985 | Cabrol | |
| 4,545,552 A | 10/1985 | Welles | |
| 4,598,885 A | 7/1986 | Waitzman | |
| 4,605,183 A | 8/1986 | Gabriel | |
| 4,671,473 A | 6/1987 | Goodson | |
| 4,674,709 A * | 6/1987 | Welles | B64C 23/065 244/199.4 |
| 4,714,215 A | 12/1987 | Jupp et al. | |
| 4,722,499 A | 2/1988 | Klug | |
| 4,949,919 A | 8/1990 | Wajnikonis | |
| 5,039,032 A | 8/1991 | Rudolph | |
| 5,102,068 A * | 4/1992 | Gratzer | B64C 5/08 244/199.4 |
| 5,156,358 A | 10/1992 | Gerhardt | |
| 5,275,358 A | 1/1994 | Goldhammer et al. | |
| 5,348,253 A | 9/1994 | Gratzer | |
| 5,407,153 A | 4/1995 | Kirk et al. | |
| 5,634,613 A | 6/1997 | McCarthy | |
| 5,961,068 A | 10/1999 | Wainfan et al. | |
| 5,992,793 A | 11/1999 | Perry et al. | |
| 6,089,502 A | 7/2000 | Herrick et al. | |
| 6,227,487 B1 | 5/2001 | Clark | |
| 6,260,809 B1 * | 7/2001 | Egolf | B64C 27/463 244/17.11 |
| 6,345,790 B1 | 2/2002 | Brix | |
| 6,474,604 B1 * | 11/2002 | Carlow | B64C 23/065 244/130 |
| 6,484,968 B2 | 11/2002 | Felker | |
| 6,578,798 B1 | 6/2003 | Dizdarevic et al. | |
| 6,722,615 B2 | 4/2004 | Heller et al. | |
| 6,827,314 B2 | 12/2004 | Barriety | |
| 6,886,778 B2 | 5/2005 | McLean | |
| 6,926,345 B2 | 8/2005 | Ortega et al. | |
| 7,275,722 B2 | 10/2007 | Irving et al. | |
| 7,475,848 B2 | 1/2009 | Morgenstern et al. | |
| D595,211 S | 6/2009 | Cazals | |
| 7,597,285 B2 | 10/2009 | Schweiger | |
| 7,644,892 B1 * | 1/2010 | Alford, Jr. | B64C 23/065 244/123.1 |
| 7,744,038 B2 | 6/2010 | Sankrithi et al. | |
| 7,900,876 B2 | 3/2011 | Eberhardt | |
| 7,900,877 B1 | 3/2011 | Guida | |
| 7,971,832 B2 | 7/2011 | Hackett et al. | |
| 7,980,515 B2 | 7/2011 | Hunter | |
| 7,988,099 B2 | 8/2011 | Bray | |
| 7,988,100 B2 | 8/2011 | Mann | |
| 7,997,875 B2 | 8/2011 | Nanukuttan et al. | |
| 8,123,160 B2 | 2/2012 | Shepshelovich et al. | |
| 8,342,456 B2 | 1/2013 | Mann | |
| 8,366,056 B2 | 2/2013 | Garang | |
| 8,439,313 B2 | 5/2013 | Rawdon et al. | |
| 8,490,925 B2 | 7/2013 | Buescher et al. | |
| 8,944,386 B2 | 2/2015 | Gratzer | |
| 2002/0092947 A1 | 7/2002 | Felker | |
| 2002/0162917 A1 | 11/2002 | Heller et al. | |
| 2005/0173592 A1 * | 8/2005 | Houck | B63B 1/248 244/45 R |
| 2007/0018037 A1 | 1/2007 | Perlo et al. | |
| 2007/0114327 A1 | 5/2007 | Dees et al. | |
| 2007/0131821 A1 | 6/2007 | Johan | |
| 2007/0252031 A1 | 11/2007 | Hackett et al. | |
| 2008/0116322 A1 | 5/2008 | May | |
| 2008/0191099 A1 | 8/2008 | Werthmann et al. | |
| 2008/0308683 A1 | 12/2008 | Sankrithi et al. | |
| 2009/0039204 A1 | 2/2009 | Eberhardt | |
| 2009/0065632 A1 | 3/2009 | Cazals | |
| 2009/0084904 A1 * | 4/2009 | Detert | B64C 23/065 244/199.4 |
| 2009/0302167 A1 | 12/2009 | Desroche | |
| 2010/0006706 A1 | 1/2010 | Breitsamter et al. | |
| 2010/0019094 A1 | 1/2010 | Theurich et al. | |
| 2010/0123047 A1 | 5/2010 | Williams | |
| 2010/0163670 A1 | 7/2010 | Dizdarevic et al. | |
| 2010/0181432 A1 | 7/2010 | Gratzer | |
| 2011/0024556 A1 | 2/2011 | Cazals et al. | |
| 2011/0192937 A1 | 8/2011 | Buescher et al. | |
| 2011/0272530 A1 | 11/2011 | Mann | |
| 2012/0049007 A1 | 3/2012 | Hunter | |
| 2012/0049010 A1 | 3/2012 | Speer | |
| 2012/0091262 A1 | 4/2012 | Rawdon et al. | |
| 2012/0187251 A1 | 7/2012 | Guida | |
| 2012/0286122 A1 | 11/2012 | Tankielun et al. | |
| 2012/0312928 A1 | 12/2012 | Gratzer | |
| 2012/0312929 A1 | 12/2012 | Gratzer | |
| 2013/0092797 A1 | 4/2013 | Wright et al. | |
| 2013/0256460 A1 | 10/2013 | Roman et al. | |
| 2014/0346281 A1 | 11/2014 | Gratzer | |

FOREIGN PATENT DOCUMENTS

| | | |
|---|---|---|
| DE | 3638347 A1 | 5/1988 |
| DE | 19752369 A1 | 5/1999 |
| DE | 20211664 U1 | 1/2003 |
| DE | 10207767 A1 | 9/2003 |
| EP | 0094064 A1 | 11/1983 |
| EP | 0122790 A1 | 10/1984 |
| EP | 1375342 B1 | 1/2004 |
| EP | 1924493 B1 | 5/2008 |
| EP | 2084059 B1 | 8/2009 |
| EP | 1883577 B1 | 1/2010 |
| EP | 2274202 B1 | 1/2011 |
| EP | 2610169 B1 | 7/2013 |
| FR | 418656 A | 12/1910 |
| FR | 444080 A | 10/1912 |
| FR | 726674 A | 6/1932 |
| GB | 2282996 A | 4/1995 |
| WO | 8204426 A1 | 12/1982 |
| WO | 9511159 A1 | 4/1995 |
| WO | 03000547 A1 | 1/2003 |
| WO | 2005099380 A2 | 10/2005 |
| WO | 2007031732 A1 | 3/2007 |
| WO | 2008061739 A1 | 5/2008 |
| WO | 2010124877 A1 | 11/2010 |
| WO | 2012007358 A1 | 1/2012 |
| WO | 2012171034 A1 | 12/2012 |
| WO | 2013007396 A1 | 1/2013 |

OTHER PUBLICATIONS

CN 200980132637.3 filed Feb. 21, 2011 First Office Action dated Dec. 25, 2012.

CN 200980132637.3 filed Feb. 21, 2011 Second Office Action dated Aug. 19, 2013.

CN 200980132637.3 filed Feb. 21, 2011 Third Office Action dated Apr. 10, 2014.

CN 201280038839.3 filed Feb. 8, 2014 First Office Action dated Feb. 2, 2015.

CN 201280038841.0 filed Feb. 8, 2014 First Office Action dated Jan. 29, 2015.

EP 09767892.4 Extended European Search Report dated Aug. 30, 2013.

EP 12 796 526.7 filed Jan. 8, 2014 Extended European Search Report dated Feb. 26, 2015.

EP 12 797 495.4 filed Dec. 19, 2013 Extended European Search Report dated Mar. 5, 2015.

EP 13161204.6 filed Jul. 7, 2011 European Search Report dated May 17, 2013.

Gilkey, R. D. et al., "Design and Wind Tunnel Tests of Winglets on a DC-10 Wing," Apr. 1979, 52 pages.

Jameson, A., "Aerodynamic Design," Prceedings Computational Science for the 21st Centuty, May 1997, 16 pages.

(56) References Cited

OTHER PUBLICATIONS

Jameson, Antony, "Re-Engineering the Design Process Through Computation," Journal of Aircraft, vol. 36, No. 1, Jan-Feb 1999, pp. 36-50.
Kroo, I., "Nonplanar Wing Concepts for Increased Aircraft Efficiency," CKI Lecture Series on Innovative Configurations and Advanced Concepts for Future Civil Aircraft, Jun. 6-10, 2005.
McDonnell Douglas Press Release, "McDonnell Douglas Unveils New MD-XX Trijet Design," Sep. 4, 1996, 1 page.
Nangia, R. J. et al., "Aerodynamic Design Studies of Conventional & Unconventional Wings with Winglets," 24th Applied Aerodynamics Conference, Jun. 5-8, 2006, 18 pages.
Norris, Guy et al., "Shaping Up," Aviation Week, May 7, 2012, pp. 37-38, vol. 174, No. 16.
PCT/EP2011/061552 filed Jul. 7, 2011 International Search Report and Written Opinion dated Oct. 7, 2011.
PCT/US2009/048065 filed Jun. 19, 2009 International Search Report dated Aug. 17, 2009.
PCT/US2009/048065 filed Jun. 19, 2009 Written Opinion and International Preliminary Report on Patentability dated Aug. 17, 2009.
PCT/US2012/041936 filed Jun. 11, 2012 International Search Report and Written Opinion dated Aug. 31, 2012.
PCT/US2012/041961 filed Jun. 11, 2012 International Preliminary Report on Patentability dated Dec. 27, 2013.
PCT/US2012/041961 filed Jun. 11, 2012 International Search Report and Written Opinion dated Sep. 6, 2012.
Starlionblue (Jun. 10, 2009) Could Boeing Reconsider the MD-12? [Msg 11]. Message posted to http://www.airliners.net/aviation-forums/general_aviation/read.main/4443449/2/#menu27.
Tibbits, George (May 16, 1992) Superjumbo Jets Are Ocean Liners for the Skies. Casa Grande Arizona Dispatch, p. 12.
Trucchi, Marco, "Fluid Mechanics of Yacht Keels," Dec. 18, 1996.
U.S. Appl. No. 12/488,488, filed Jun. 19, 2009 Advisory Action dated Feb. 27, 2013.
U.S. Appl. No. 12/488,488, filed Jun. 19, 2009 Final Office Action dated Dec. 6, 2012.
U.S. Appl. No. 12/488,488, filed Jun. 19, 2009 Final Office Action dated Feb. 14, 2012.
U.S. Appl. No. 12/488,488, filed Jun. 19, 2009 Non-Final Office Action dated Jul. 3, 2012.
U.S. Appl. No. 12/488,488, filed Jun. 19, 2009 Non-Final Office Action dated Oct. 13, 2011.
U.S. Appl. No. 13/493,843, filed Jun. 11, 2012 Advisory Action dated Apr. 21, 2014.
U.S. Appl. No. 13/493,843, filed Jun. 11, 2012 Final Office Action dated Feb. 14, 2014.
U.S. Appl. No. 13/493,843, filed Jun. 11, 2012 Final Office Action dated Sep. 26, 2014.
U.S. Appl. No. 13/493,843 filed Jun. 11, 2012 Non-Final Office Action dated Jun. 11, 2014.
U.S. Appl. No. 13/493,843 filed Jun. 11, 2012 Non-Final Office Action dated Oct. 7, 2013.
U.S. Appl. No. 13/493,915 filed Jun. 11, 2012 Advisory Action dated Nov. 19, 2014.
U.S. Appl. No. 13/493,915 filed Jun. 11, 2012 Non-Final Office Action dated May 23, 2014.
U.S. Appl. No. 13/493,915 filed Jun. 11, 2012 Non-Final Office Action dated Sep. 11, 2014.
Whitcomb, Richard T., "A Design Approach and Selected Wind-Tunnel Results at High Subsonic Speeds for Wing-Tip Mounted Winglets," NASA Technical Note, Jul. 1976.
Wilhelm, Steve, "Winglet's Split Personality," Puget Sound Business Journal, Aug. 16-22, 2013.

\* cited by examiner

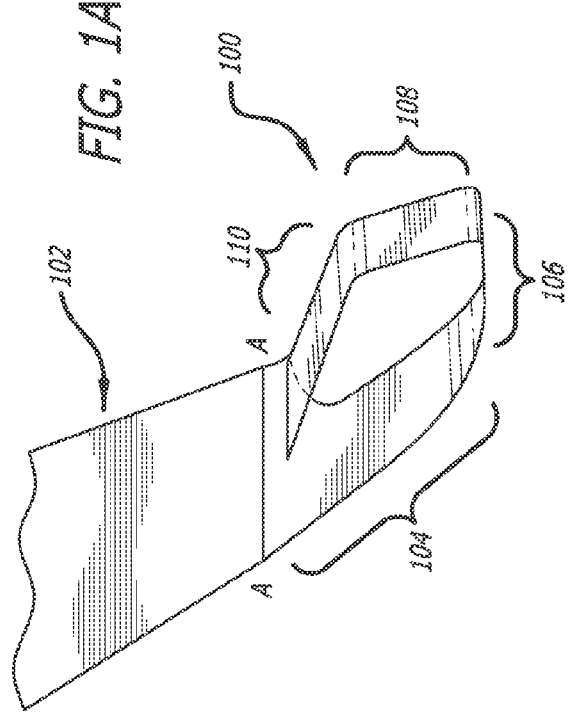
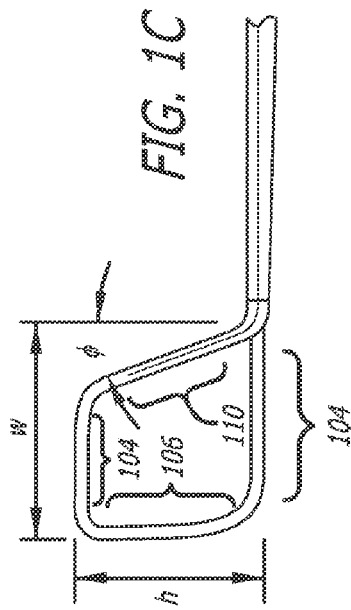
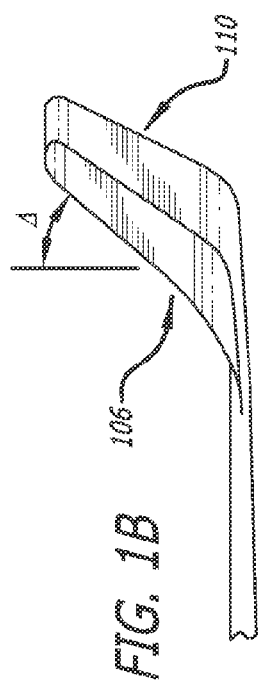

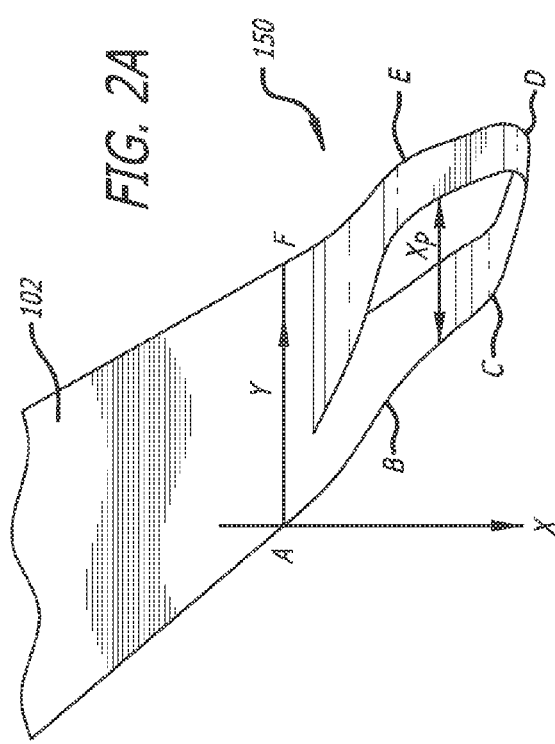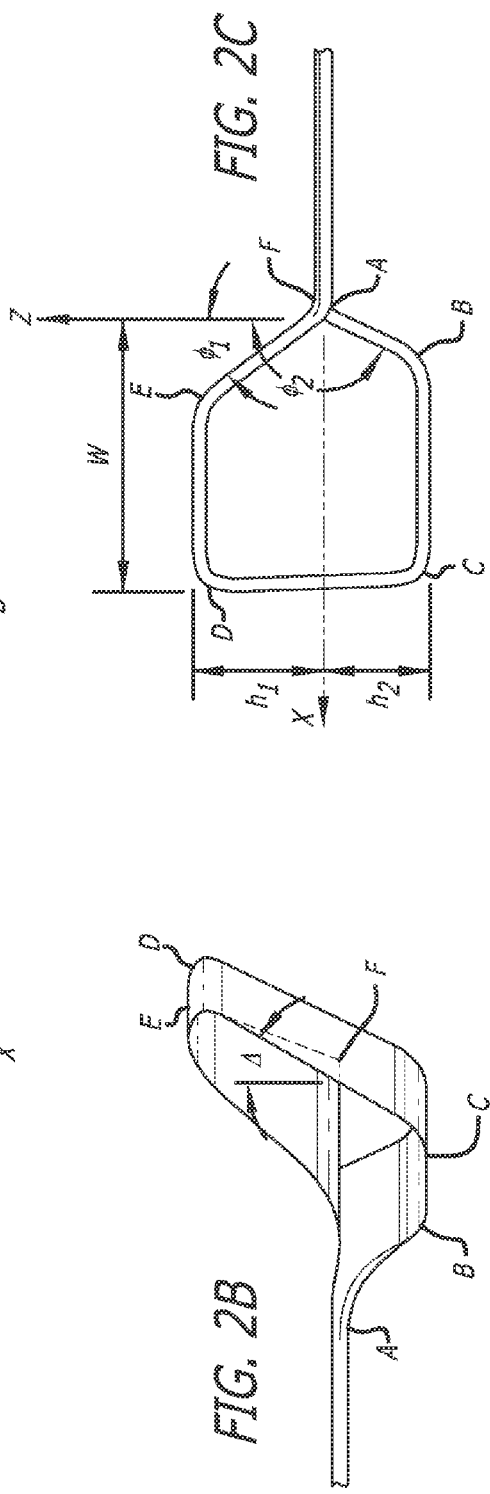

SPLIT SPIROID

PRIORITY

This application is a divisional of U.S. patent application Ser. No. 13/493,915, filed Jun. 11, 2012, now U.S. Pat. No. 9,038,963, which claims the benefit of priority to U.S. Provisional Application No. 61/495,236, filed Jun. 9, 2011, which is incorporated by reference in its entirety into this application.

BACKGROUND

U.S. Pat. No. 5,102,068, titled "Spiroid-Tipped Wing," which is incorporated by reference into this application as if fully set forth herein, generally discloses a spiroid-tipped wing, including a wing-like lifting surface and a spiroidal tip device integrated so as to minimize the induced drag and/or to alleviate noise effects. The ends of the spiroid are attached to the wing tip at appropriate sweep and included angles to form a continuous and closed extension of the wing surface. This yields a closed, structurally continuous contour of ovular shape when viewed along the airstream direction.

Various wing tip devices and geometries are described, for example, in U.S. Pat. Pub. No. 2007/0252031 (titled "Wing Tip Devices," published Nov. 1, 2007), U.S. Pat. Pub. No. 2007/0114327 (titled "Wing Load Alleviation Apparatus and Method," published May 24, 2007), U.S. Pat. No. 6,722,615 (titled "Wing Tip Extension for a Wing," issued Apr. 20, 2004), U.S. Pat. No. 6,827,314 (titled "Aircraft with Active Control of the Warping of Its Wings," issued Dec. 7, 2004), U.S. Pat. No. 6,886,778 (titled "Efficient Wing Tip Devices and Methods for Incorporating such Devices into Existing Wing Designs," issued May 3, 2005), U.S. Pat. No. 6,484,968 (titled "Aircraft with Elliptical Winglets," issued Nov. 26, 2002), U.S. Pat. No. 5,348,253 (titled "Blended Winglet," issued Sep. 20, 1994), each of which is incorporated by reference into this application as if fully set forth herein.

SUMMARY

The spiroid wing tip according to embodiments of the invention includes a characteristic loop profile. The spiroid profile is lowered with respect to the wing chord plane, such that a portion of the spiroid wing tip extends below the wing chord plane. The sections of the spiroid may be designed to improve various aerodynamic characteristics.

BRIEF DESCRIPTION OF THE DRAWINGS

The disclosed systems and methods can be better understood with reference to the following drawings. The components in the drawings are not necessarily to scale.

FIGS. 1A-1C illustrate an exemplary spiroid wing tip coupled to a wing according to embodiments of the invention.

FIGS. 2A-2C illustrate an exemplary split-spiroid wing tip coupled to a wing according to embodiments of the invention.

DESCRIPTION

Figure 3A:
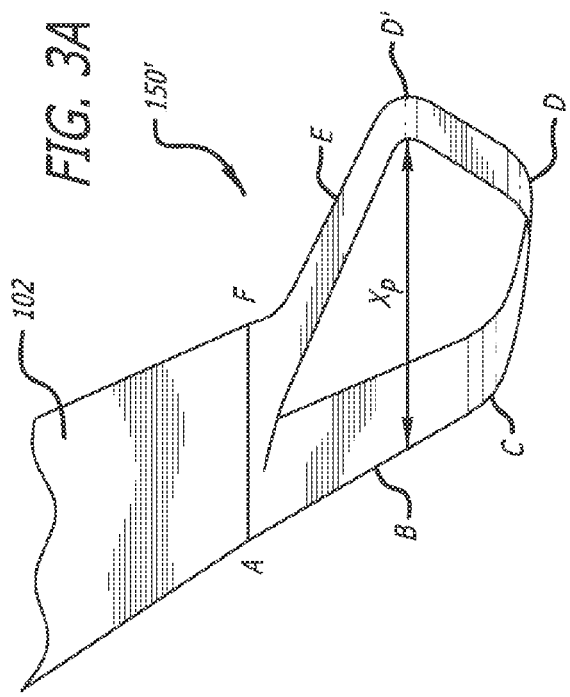
FIGS. 3A-3C illustrate an exemplary split-spiroid wing tip coupled to a wing according to embodiments of the invention.

The following description and accompanying figures, which describe and show certain embodiments, are made to demonstrate, in a non-limiting manner, several possible configurations of a split spiroid wingtip according to various aspects and features of the present disclosure.

The spiroid wing tip is an aerodynamic concept for wing tip devices which has proven to be superior to other known wing device, such as winglets, in terms of performance with minimal structural impact. The spiroid wing tip reduces drag generated by wingtip vortices. The spiroid wing tip according to embodiments of the invention includes a characteristic loop profile. While the various elements of the traditional spiroid may be arranged for particular advantage, the spiroid profile thereof was placed entirely above the wing chord plane. However, general application studies have raised issues such as dynamic loads and flutter, wing deformation, etc. that tend to limit the traditional spiroid potential for certain aircraft designs. Therefore, the split spiroid concept, described herein, places the hoop centroid closer to the wing chord plane. This has the effect of changing the inertial parameters to significantly reduce flutter ballast requirements and dynamic gust response. Other configuration geometry choices are available to minimize structural impact and improve aerodynamic characteristics and performance.

FIG. 1 illustrates a spiroid wing tip 100 coupled to a wing 102. FIG. 1A illustrates a top view, FIG. 1B illustrates a side view, and FIG. 1C illustrates a rear view of the spiroid wing tip. The spiroid wing tip 100 has a closed loop profile above the wing chord plane. The spiroid wing tip may be swept at an angle $\Lambda$, as seen in FIG. 1B.

As seen in FIG. 1, the wing tip 100 projects from the wing 102 at A-A generally along the plane of the wing and then loops above the wing chord plane to create a closed loop at the intersection A-A. As shown, the spiroid is composed of generally four sections.

The first section 104 extends generally planar to the wing and oriented along the length of the wing. The chord length of the first section 104 may be equal or less than the chord length of the wing at the tip A-A. FIG. 1 illustrates a reduced chord length compared to the wing at A-A, such that the leading edge of section 104 is generally continuous with the leading edge of the wing 102, and the trailing edge of section 104 emanates from a lower surface of the closed loop spiroid. The first section 104 generally extends a distance w from the wing end A-A. The first section 104 may be tapered along its length such that a larger chord length exists near the plane (at A) than away from the plane (near section 106).

The spiroid wing tip then transitions to a second section 106 approximately 90° to the first section above the wing plane. As seen in FIG. 1B, the second section 106 is swept at an angle $\Lambda$ with respect to vertical. The second section 106 is also tapered from the lower portion to an upper portion, so that the lower portion of the second section 106 is wider than the upper portion. The second section extends vertically a distance h before curving 90° toward the wing into the third section 108.

The third section is generally parallel to the first section 104 but may be shorter than the first section. The third section may have a generally constant chord length or may be tapered along its length. For example, section 104 may be reverse tapered as the section is traversed toward the plane so that the chord length is a minimum at a point furthest from the plane (near section 106). The third section may also be swept rearward so that the fourth section 108, described below, may be swept at the same angle as the second section 106.

The fourth section 108 transitions the third section 108 to the wing 102 along an angle φ from vertical. The fourth section 110, similar to the second section 106, may be swept at an angle Λ and tapered so that the upper section has a reduced chord length compared to the lower section. The trailing edge of the fourth section 108 is continuous with the trailing edge of the wing 102, while a leading edge of the fourth section may emanate from an upper surface of the wing 102 or first section 104.

Each section is generally planar with curved transitions between sections to create a generally quadrilateral form as viewed from the rear. The chord length of the spiroid may be less than the chord length of the wing at the attachment point A-A, such that the first section 104 and fourth section 110 overlap in an offset manner as seen from above, while the leading and trailing edges of the wing are continuous with a leading edge of the first section and a trailing edge of the fourth section. Referring to FIG. 1A, the trailing edge of the first section 104 emanates from a lower surface of the fourth section 110, while the leading edge of the fourth section 108 emanate from an upper surface of the first section 104.

As shown, each section is continuously tapered from the airplane body toward the transition between sections 106 and 108. Therefore, the chord diameter decreases across section 104 away from the plane and up section 106 to a minimum length near 108. The chord length then increases across section 108 toward the plane and down section 110. The taper of each section may be variable, such that the taper along the horizontal sections 104 and 108 is minimal, while the taper of the vertical sections 106 and 110 is more pronounced. Alternative taper patters are also contemplated. For example, the spiroid may continually tapper from a larger first diameter at the original of the first section, extending from the wing tip, around each of the sections to a smaller second diameter at the terminal end of the fourth section at the wing tip. Alternatively, the second and fourth sections extending above the wing of the plane may be tapered so that the lower portion of the section has a greater chord length than an upper section. The first and third sections may generally maintain a constant chord length, with the third section having a smaller chord length than the first section to correspond to the taper of the second and fourth sections.

FIG. 1 illustrates an exemplary spiroid wing tip. Each section of the spiroid may be swept forward or rearward as necessary to optimize design parameters. Each section may also include an additional angle with respect to the wing plane (cant angle) so that the spiroid is tilted above or below the wing plane. In addition, each section may be continuously or separately tapered. The configuration of the spiroid may also be mirrored so that the first section extending from the wing is continuous with the wing trailing edge, while the fourth section extending above the wing chord plane is continuous with the wing leading edge. The leading and trailing edge of the spiroid will generally be continuous such that transitions between each section are curved.

FIG. 2 is a three-view illustration of an exemplary split-spiroid according to embodiments of the invention. FIG. 2A is a top view; FIG. 2B is a side view; and FIG. 2C is a rear view of an exemplary split-spiroid form. The split-spiroid attaches to the wing at A-F. It retains the closed-loop profile similar to that of FIG. 1, except that its centroid is lowered relative to the wing chord plane. The split is variable depending on the design objectives and the desired loading of the surfaces. The split design lowers the center of gravity of the spiroid closer to wing plane, and therefore reduces exposure to flutter issues present in the spiroid of FIG. 1. FIG. 2 illustrates a generic representation of the split spiroid to provide maximum drag reduction with minimum bending moment and weight increments. FIG. 2 also illustrates an exemplary embodiment of the split spiroid to reduce exposure to flutter issues for typical sizing parameter values by lowering the spiroid center of gravity toward the wing plane.

As seen in FIG. 2 the spiroid originates at the wing along the leading edge at A, the spiroid is a planar projection directed generally downward (negative z), toward the tail of the plane (positive y), and away from the plane body (positive x) at a cant angle $\phi_2$ to point B. Section A-B is swept toward the tail of the plane at approximately the same angle or greater angle as the wing axis, as shown. The section A-B may be tapered away from the wing so that a chord length near A is greater than a chord length near B. The spiroid then extends generally horizontal (no z displacement) and extends along the wing axis (positive x and y) from point B toward point C. The section B-C may be swept toward the rear of the plane at generally the same sweep as the wing, (i.e. along the wing axis). This section may have a generally constant chord length. The spiroid then projects vertically (positive z, with minimal x displacement), but is swept toward the rear of the plane (positive y) by an angle Λ. This section may be tapered so that the lower portion has a greater chord length than the upper portion. The next section extends from D to E generally horizontal (minimal z displacement) generally toward the plane body (negative x) and may be angled slightly toward the nose of the plane (negative y). Similar to section B-C, this section may not be tapered. Therefore, the minimal chord length along the spiroid is near the transition at D. The spiroid closes the loop by projecting downward (negative z) and toward the plane body (negative x) and toward the plane nose (negative y) so that the trailing edge of section E-F meets with the trailing edge of the wing. Section E-F may be tapered similar to section A-B so that the greater chord length is near the wing at F. To achieve the taper along section E-F, the trailing edge of the spiroid may be generally along the wing axis or directed slightly more toward the nose of the plane as the section is traverse from E to F (forward sweep), while the leading edge is angled to a greater extent. The tapered sections A-B and E-F closed the spiroid loop by overlapping the ends in an offset configuration as seen from above.

Figure 3C:
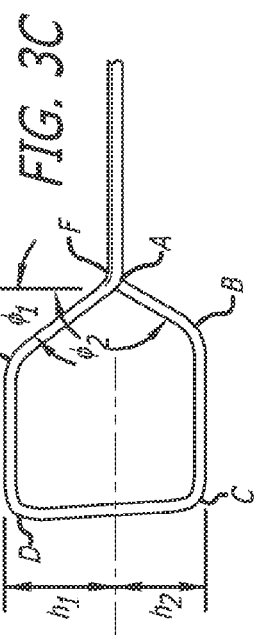
Figure 3B:
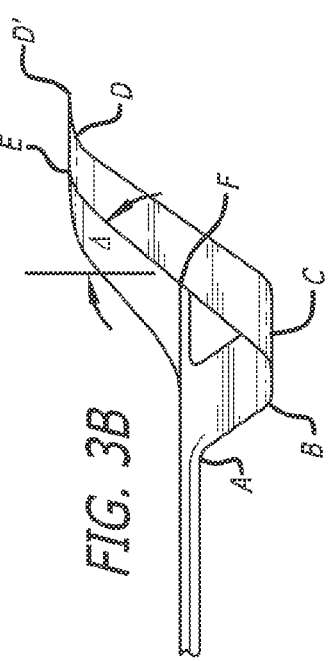

FIG. 3 is a three-view illustration of an exemplary split-spiroid according to embodiments of the invention. FIG. 3A is a top view; FIG. 3B is a side view; and FIG. 3C is a rear view of an exemplary split-spiroid form. FIG. 3 is similar to the split-spiroid of FIG. 2 except the leading and trailing edges of the spiroid project at different angles with respect to the wing leading and trailing edge as viewed from above to increase the displacement of the leading edges of the horizontal sections of the spiroid (indicated by x). The upper spiroid section is contoured so that the furthest rearward extend of the spiroid occurs along the length of the top horizontal section. The form of FIG. 3 illustrates an exemplary design to exert a significant counter-torque at the wing tip in order to minimize the adverse effect on performance produced by wing twist. Specifically, increasing the $x_p$ displacement changes the load distribution along the spiroid to create a counter-torque to reduce wing twist.

As seen in FIG. 3 the spiroid originates at the wing along the leading edge at A, the spiroid is a planar projection directed generally downward (negative z), toward the tail of the plane (positive y), and away from the plane body (positive x) to point B. As seen from above, the leading edge along section A-B is a continuous extension of the leading edge of the wing, i.e. section A-B is along the axis of the wing when viewed from above. Section A-B may be slightly tapered away from the wing end so a larger chord length is near the wing at A than away from the wing at B. The spiroid then extends generally horizontal (no z displacement) and extends along the wing axis (positive x and y) from point B toward point C. As viewed from above, the leading edge from the wing through points A, B, and C is generally continuous and constant. The taper along these sections is similarly generally continuous, where section B-C may have an equal or slightly reduced taper to section A-B. The spiroid then projects vertically (positive z, minimal x displacement), but is swept toward the rear of the plane (positive y) by an angle $\Lambda$. This section may be tapered from the lower end at C to the upper end at D either at approximately the same taper or slightly greater taper than the preceding sections. The next section extends from D to E generally horizontal (no z displacement). This section may be curved or composed of more than one linear section so that the furthest rearward extent (maximum x) of the spiroid occurs along section D-E. As shown, this section extends generally linearly from D to D' toward the tail of the plane (negative x, positive y) and then toward the nose of the plane from D' to E (negative x, negative y). The section may be tapered along its length in various configurations. As shown, section D-E may be generally constant or tapered along D-D' at the same extent or lesser extent as the previous section, while D' to E may be constant or reverse tapered so the shortest chord-wise length occurs at D'. D' may occur along the length of D-E, and may be closer to one end than the other. As shown, D' occurs closer to end E, toward the plane so that the furthest rearward extent of the spiroid occurs closer toward the middle of the spiroid (w/2) or closer toward the center of the lower section B-C. The spiroid closes the loop by projecting downward (negative z) and toward the plane body (negative x) and toward the plane nose (negative y) so that the trailing edge of the edge section E-F meets with the trailing edge of the wing. The chord length through section E-F may be a continuation of the taper from D' to E, or may taper by a greater extent so that the chord length near the wing (at F) is greater than away from the wing. The sections A-B and E-F closed the spiroid loop by overlapping the ends (along A-F) in an offset configuration as seen from above.

Figure 4C:
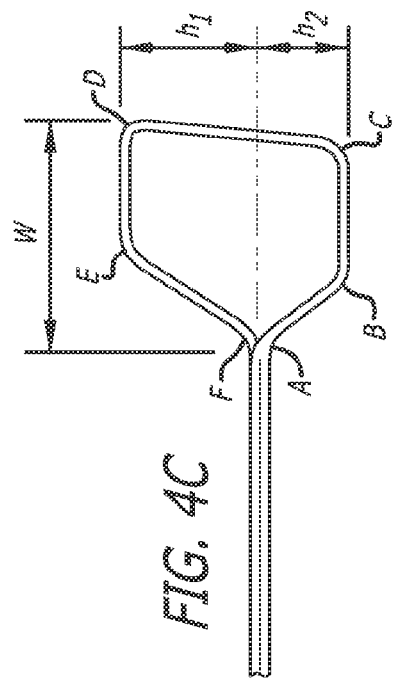
FIGS. 4A-4C illustrate an exemplary split-spiroid wing tip coupled to a wing according to embodiments of the invention.
Figure 4A:
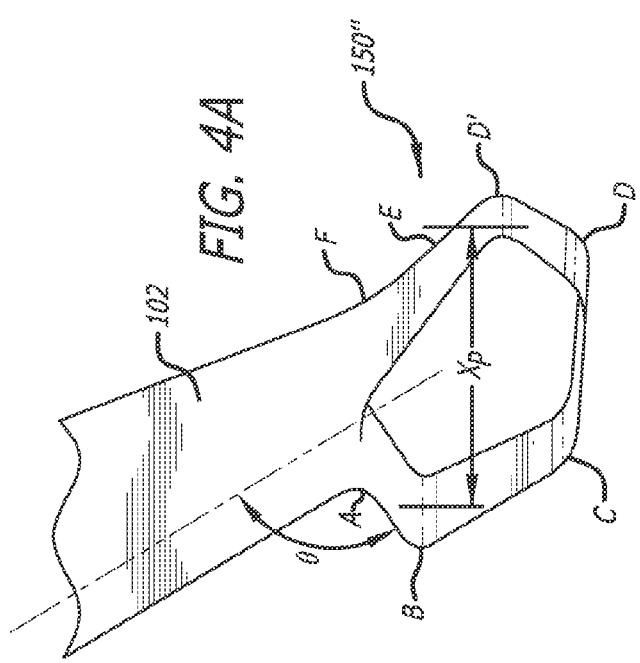
Figure 4B:
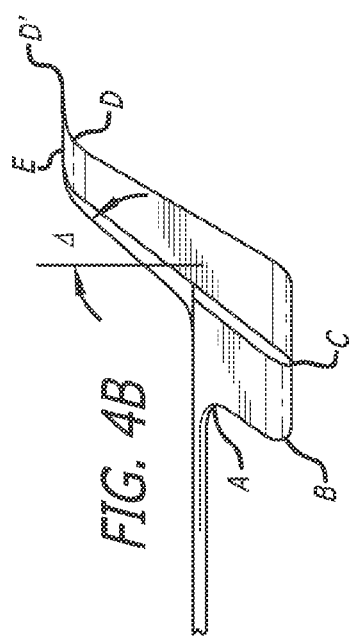

FIG. 4 is a three-view illustration of an exemplary split-spiroid according to embodiments of the invention. FIG. 4A is a top view; FIG. 4B is a side view; and FIG. 4C is a front view of an exemplary split-spiroid form. FIG. 4 is similar to the split-spiroid of FIG. 3 except the leading and trailing edges project at different angles with respect to the wing leading and trailing edges to further increase the displacement of the leading edges of the horizontal sections of the spiroid (indicated by $x_p$). The height and width dimensions of the spiroid may also be adjusted. The amount of taper along one or more of the spiroid sections may also be greater. FIG. 4 illustrates an exemplary embodiment of the split spiroid to provide a major counter-torque at the wing tip in order to minimize the adverse effect on performance that would occur due to twist for wing configurations that are highly flexible. This favorable effect should exceed, by a factor of two or more, the drag penalty due to the non-optimum loading on the spiroid itself. The geometric arrangement features a large spread along the x-axis in order to maximize counter-torque due to the aerodynamic loading. (See, FIG. 6 below with respect to the load comparisons of each exemplary design.

In some applications, it may be important to minimize wing tip load and twist or to minimize the susceptibility to flutter and ballast requirements. To accommodate such applications, several variations of the disclosed forms are suitable although at some nominal cost in performance. Therefore, it is within the scope of the present invention to incorporate any of the design configurations including cant and sweep angles, tapers, dimensions, etc. in various configurations, arrangements, combinations, and sub-combinations, including modifications to accommodate such device.

As seen in FIG. 4 the spiroid originates at the wing along the leading edge at A, the spiroid is a planar projection directed generally downward (negative z), toward the front of the plane (negative y), and away from the plane body (positive x) to point B. The spiroid then extends generally horizontal (no z displacement) and extends generally along the wing axis (positive x and y) from point B toward point C. The spiroid then projects vertically (positive z, minimal x displacement), but is swept toward the rear of the plane (positive y) by an angle $\Lambda$. The sweep and taper along section C-D may be greater than that of FIG. 3, described above. The next section extends from D to E generally horizontal (no z displacement) and curved along its length similar to FIG. 3 so that the furthest rearward extent of the spiroid occurs along the length of D-E at D'. D' may occur generally at a midpoint along D-E. The spiroid closes the loop by projecting downward (negative z) and toward the plane body (negative x) and toward the plane nose (negative y) so that the trailing edge of the edge section E-F meets with the trailing edge of the wing. The spiroid may taper along each section by varying degree. The taper along C-D and E-F are designed so that the upper portion of each section has a reduced chord length than a lower portion of each respective section. Section D-E may have a generally constant chord length approximately equal to the chord length at the upper ends of sections C-D (i.e. at D) and E-F (i.e. at E). Section D-E may have a shorter span-wise length than section B-C, as seen in FIG. 4C. Section A-B tapers from the wing end A-F so that section A-B has a greater chord length near the wing at point A than away from the wing at point B. The tapered sections A-B and E-F closed the spiroid loop by overlapping the ends in an offset configuration as seen from above.

The split-spiroid wingtip 150, 150', and 150" as seen in FIGS. 2-4 are generally composed of five sections along points A-B-C-D-E-F. As seen from the front or rear views, the section A-B transitions the spiroid a distance '$h_2$' below the wing chord plane in a generally planar manner at an angle $\phi_2$ with respect to vertical. The next section B-C generally extends horizontally away from the wing a distance 'w' from the wing end A-F. The section B-C is less than 'w' to accommodate the transition of section A-B from the wing end A. The section C-D is approximately 90° from section B-C to extend the spiroid in a vertical direction a distance 'h' above section B-C. The spiroid then loops back toward the plane in a generally horizontal section D-E. The spanwise lengths of sections D-E and B-C may be approximately equal, or one may be less than the other. The final section E-F closes the spiroid form, generally extending planar from the section D-E to the wing end at F at an angle $\phi_1$ with respect to vertical.

The top of the spiroid, along section D-E, is a distance $h_1$ above the wing chord plane, while the bottom of the spiroid, along section B-C, is a distance $h_2$ below the chord plane. The split may be variable depending on design objections and the desired loading of the surfaces. The vertical displacement of sections B-C and D-E (i.e. $h_2$ and $h_1$) may be chosen so that the hoop centroid is near the wing chord plane. This has the effect of changing the inertial parameters to significantly reduce flutter ballast requirements and dynamic gust response. Preferably, the geometric split is a ratio of $h_2$ to $h_1$ of approximately between 0.4 and 1.0 ($1.0 \leq h_2/h_1 \leq 0.4$). This configuration should put the center of gravity of the spiroid at or just above the wing chord plane. The ratio depends on spiroid parameters, such as taper and cant angles, but is preferably between approximately 0.4 and 0.6, and more preferably approximately 0.6. More extreme values can be used depending on geometric and airplane performance requirements, which include unit weight, center of gravity location, ground proximity, flutter susceptibility, etc. The effect on drag reduction, $\Lambda AC_D/C_D$ is generally small (approximately less than 0.5%) but noticeable so tradeoff relationships are important. The ratio of h to w impacts the drag of the spiroid. A ratio of h to w approximately equal to 1.0 provides essentially optimal drag reduction. Further increases in w/h is only marginally effective. As seen in FIG. 3, the ratio of w/h may be increased at the expense of drag reduction in order to bias the load distribution. Other configuration geometry choices are available to minimize structural impact and improve aerodynamic characteristics and performance.

Each of the sections may be oriented with respect to the airplane to improve certain design criteria. For example, the split-spiroid is swept at an angle $\Lambda$ from vertical. The sweep may be about the same as previously disclosed with respect to FIG. 1. The sweep of each segment may be the same or different. In one embodiment, the sweep of each segment is about the same and is sufficient to maintain the local critical Mach number somewhat higher than the airplane cruise Mach number. Thus, the vertically extending sections A-B, C-D, and E-F may be angled with respect to vertical as seen from the side.

As seen from the top views, each section may be directed along the wing axis, or may be directed in front or behind the wing axis, where the wing axis is taken along the length of the wing parallel to the leading edge. For example, section A-B of FIG. 4 may angle toward the front of the airplane as seen from above or the side to increase the displacement x between the horizontal sections B-C and D-E of the spiroid. Therefore, section A-B of FIG. 4 may be a generally planar portion extending below the plane of the wing by an angle $\phi_2$ while simultaneously angling toward the front of the plane at an angle $\theta$ as viewed from above ($90° < \theta < 180°$). The section A-B may project along the wing leading edge ($\theta = 180°$), similar to FIG. 3, or may be angled toward the rear of the plane ($180° < \theta < 270°$), similar to FIG. 2. The trailing along E-F may similarly be angled by varying amounts. Generally, the trailing edge will angle from point E toward the front of the plane to point F. The trailing edge may generally be a continuation of the wing trailing edge, simply angled above the wing chord plane, similar to FIG. 2, or may be angled to a greater extend to transition the horizontal section E-D back to the wing end, as seen in FIG. 3. Sections B-C may also be along or angled with respect to the wing axis. For example, section B-C may generally be parallel to the wing axis, similar to FIG. 2 or may be angled less than the wing axis (toward the front of the plane) or more than the wing axis (toward the rear of the plane) as slightly seen in FIG. 4. The lower section B-C may be oriented at a different angle than the upper section E-D to create a greater displacement between the points B and E (FIGS. 3 and 4), or may be generally parallel as seen from above (similar to FIG. 2). The lower section B-C may extend generally parallel to the wing axis, while the upper section D-E may be angled depending on the sweep of the spiroid to connected sections C-D to E-F. Section D-E may have one or more angled sections along its length as described above. Section D-E may be angled generally along the wing axis or to a greater or lesser extent, similar to section B-C. The upper section D-E may be arranged so that the end E away from the plane is toward the front of the plane, while the end D away from the plane is toward the tail of the plane, such as seen in FIGS. 3 and 4. Therefore, as the upper section transitions from the vertical section C-D moving toward the plane body, the section D-E projects horizontally toward the rear of the plane. Alternatively, section D-E may extend generally along the wing axis or may be angled toward the front of the plane, so that the point E near the plane body is closer to the plane nose and the point D away from the plane is toward the plane tail, as seen in FIG. 2. Section D-E may also include a bending point D' such that the rearward extent of the spiroid occurs along the section D-E. This section may be generally '>' shaped, or more ')' shaped, curved along its length, or a combination of the two. The maximum rearward extent may occur anywhere along section D-E, for example near a midpoint of D-E or aligned with the spiroid midpoint, aligned with the spiroid center of gravity, aligned with the midpoint of section B-C.

Each section may also include a cant angle ($\phi$) with respect to the vertical to rotate the spiroid around the wing end, A-F. Maximizing the cross sectional area of the spiroid increases the effectiveness of the device. Therefore, minimizing the cant angles is generally desired. Small inclinations (approximately less than 15°) have little impact on the design criteria. However, the cant angles may be increased to reduce weight or for other design considerations. Cant angles of approximately 15° to 30° degrees are preferable, and more preferably between approximately 15° to 20°. As shown, $\phi_1$ is approximately 30 degrees, while $\phi_2$ is approximately 160 degrees (30° from negative z).

Airfoil sections are selected to maintain low drag characteristics over the airplane operating range. This is associated with airfoil chord-wise pressure distributions and the chord and twist distributions required for optimum loading. Blending of the split-spiroid into the wing contour is incorporated at A-F to minimize aerodynamic interference drag. As seen in the top view profiles, the leading edge of section A-B and trailing edge of section E-F are continuous extensions of the leading and trailing edge of the wing, respectively. The upper and lower surfaces extend from the wing at A-F. A portion of the lower surface branches into the spiroid to form section A-B along the leading edge of the wing, and a portion of the upper surface branches into section E-F along the trailing edge. As the chord length of the spiroid is generally less than the chord length of the wing at the attachment A-F, the trailing edge of the spiroid originating along A-F emanates from a lower surface of the spiroid section E-F, while the leading edge of spiroid terminal end at F emanates from an upper surface of the spiroid section A-B. Therefore, the spiroid creates a closed loop with originating and terminal ends overlapping but offset as viewed from above. The spiroid may be designed so that the originating and terminating ends completely overlap such that the chord length across A-F is the same for the wing and the spiroid.

Spiroid unit weight is kept minimal by matching the airfoil chord to section lift requirements. Each section may therefore be tapered such that a chord-wise length is variable along the length of the section. For example, as seen in FIG. 4B, the vertically extending sections C-D, A-B and E-F, may be tapered so that a lower portion has a greater chord-wise length than the upper section. Alternatively, the sections extending from the plane wing (A-B and E-F) may be tapered so that the chord-wise length at the wing end (along A-F) is greater than a chordwise length away from the wing end (near points B or E). The chord-wise length may be consistent along the transition between each section or may change at the transition between sections. Different sections along the spiroid may be tapered by varying degrees or maintain a constant chord length. The entire spiroid may be tapered so that a minimum chord-wise length occurs near D or D' as disclosed with the maximum chord length occurring near the wing, along A-F. Alternatively, the spiroid may be tapered along its entire length such that the chord length at the origin of the spiroid (point A) is greater than the chord length along to spiroid to a minimum chord length at the spiroid terminal end (point F). Sections of the spiroid may also not be tapered such as the horizontal sections B-C and D-E. The tapers may occur at varying degree from one section to another or throughout a single section. As seen in FIG. 4, the taper along a single section may vary by different degrees, and may reverse along a section.

As shown, each of the sections are generally planar extensions. However, each section may be curved or otherwise contoured depending on the desired application. The transition between each section is generally smooth and continuous so that a curved section generally connects each planar section. Similarly, the leading and trailing edges of the wing and spiroid are also smooth and continuous, providing a curved edge through the transitions between each section. The use of the term planar does not denote the surface profile of a section or the spiroid. Instead, "planar" denotes the that the major axis of the wing (chord-wise and span-wise) lie generally in a plane. Therefore, although the airfoil profile may be curved or contoured to maximize desired aerodynamic properties, the section or structure itself may still be considered planar, if it is generally aligned along a plane.

Blending of the split-spiroid into the wing contour is incorporated at A-F to minimize aerodynamic interference drag. As seen in the top view profiles, the leading edge of section A-B and trailing edge of section E-F are continuous extensions of the leading and trailing edge of the wing, respectively. The upper and lower surfaces extend from the wing at A-F. A portion of the lower surface branches into the spiroid to form section A-B along the leading edge of the wing, and a portion of the upper surface branches into section E-F along the trailing edge. As the chord length of the spiroid is generally less than the chord length of the wing at the attachment A-F, the trailing edge of the spiroid originating along A-F emanates from a lower surface of the spiroid section E-F, while the leading edge of spiroid terminal end at F emanates from an upper surface of the spiroid section A-B. Therefore, the spiroid creates a closed loop with originating and terminal ends overlapping but offset as viewed from above. The spiroid may be designed so that the originating and terminating ends completely overlap such that the chord length across A-F is the same for the wing and the spiroid.

The originating (e.g. A-B) and terminating section (e.g. E-F) of the spiroid wing tip are therefore integrated at an end to form a wing tip attachment end configured to attach to a wing end. The wing tip attachment end may be a physical end to the spiroid designed to attached to a wing end. The wing tip may be bolted or otherwise attached to the wing end. The wing tip attachment end may also be an integrated transition from the wing profile to the spiroid wing tip profile. Thus, the wing tip attachment end may simply be a transitional boundary identified on an integrally formed wing with spiroid wing tip.

As disclosed herein, variations on a spiroid wing tip have been described to reduce drag caused by wing tip vortices. Design considerations, such as minimizing wing tip load and twist or minimizing the susceptibility to flutter and ballast requirements will change the design configuration. To accommodate such applications, several variations of the disclosed forms are suitable although at some nominal cost in performance (reducing drag). Therefore, any of the design configurations including cant and sweep angles, tapers, dimensions, etc. may be modified and/or combined in various configurations as disclosed herein. As described, changing the spiroid centroid center of gravity with respect to the wing chord plane will effect flutter issues, while increases in displacement between the spiroid leading edges will increase the counter-torque produced by the spiroid. These considerations are affected by the various configuration geometries, including cant angles, sweep angles, taper, etc. Accordingly, it would be apparent to a person of skill in the art to modify the spiroid design to incorporate any feature as disclosed herein. Therefore, each spiroid section may be separately designed to improve a specific aerodynamic characteristic as disclosed for any section of the spiroid. For example, as illustrated, only the top section includes a variable sweep angle that switches from rearward to forward as the section is traversed away from the plane. Any section may include this feature however if it is determined to improve a desired aerodynamic property. Accordingly, section B-C may similarly include a reversing sweep along its length in the opposite configuration as B-E so that the x displacement ($x_p$) may be even further maximized as taught herein. Such modifications and combinations are considered to be within the prevue of this disclosure.

Figure 5:
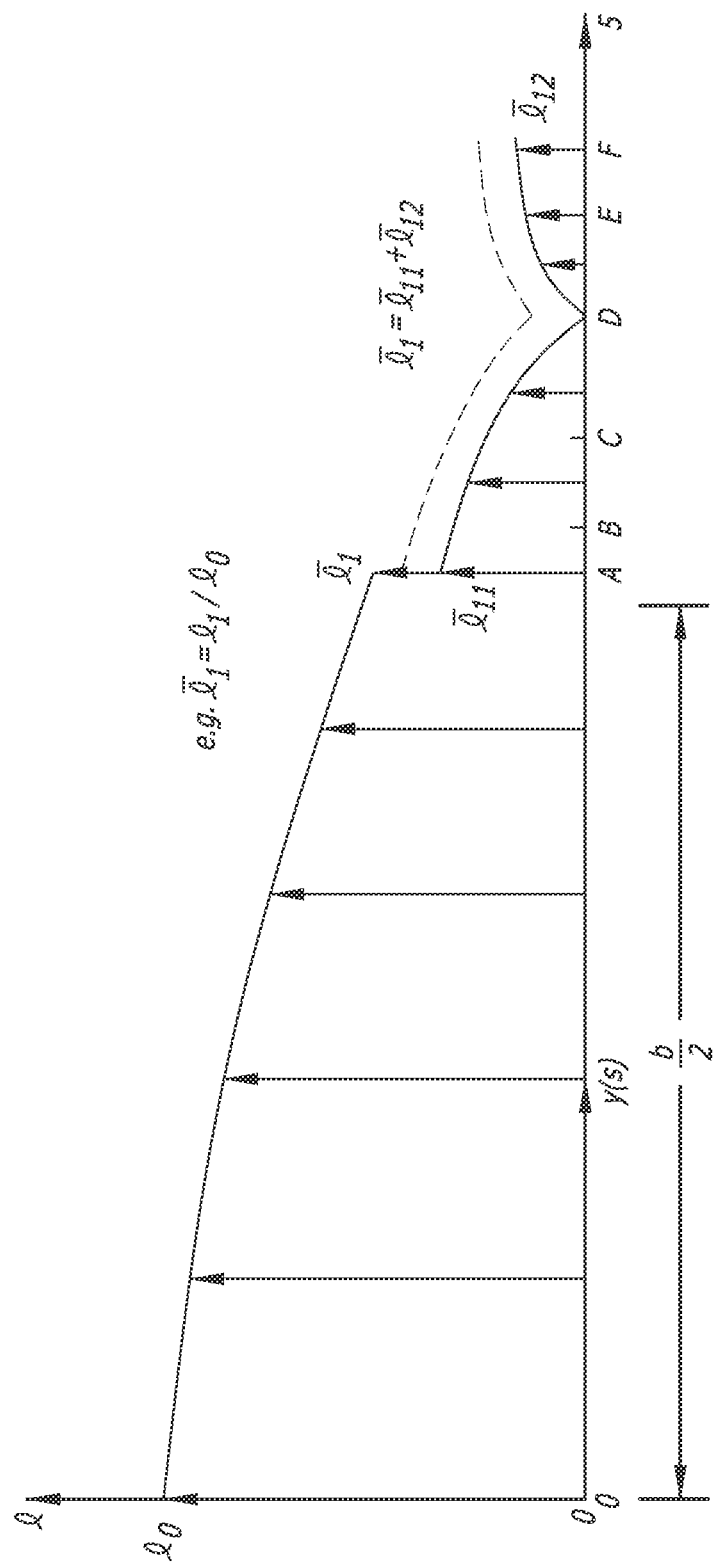
FIG. 5 illustrates an exemplary loading characteristic for the split-spiroid of FIGS. 2A-2C.

The load distribution of the general spiroid of FIG. 2 is designed to maximize the drag reduction at the airplane cruise lift coefficient. FIG. 5 illustrates an exemplary graphical representation of the loading characteristics for the split-spiroid of FIG. 2. The effectiveness of the split-spiroid is primarily determined by the distribution of load around the profile loop and efficient transition to the loading on the wing. This is a result of the optimization process to maximize the drag reduction for a given spiroid unit size. FIG. 5 illustrates the characteristics of the loading for atypical cruise flight condition. Note that the s-coordinate is introduced to represent a rollout of the spiroid profile along the y-axis.

As seen in FIG. 5, the split-spiroid incorporates a split in the loading that occurs at point A and defined by the ratio $l_{11}/l_{12}$, where $l_{11}$ is applied to the upper surface and $l_{12}$ is applied to the lower surface. The loading on the wing remains unchanged from that of the basic spiroid configuration. The optimum loading on the split-spiroid varies from positive on the lower surface ABCD, passes through zero at D and changes direction for the upper segment DEF.

The loading is defined by the following equation:

$$\hat{l} = \rho \hat{U} \times \hat{\Gamma};$$

where $\hat{l}$=load vector per unit distance along s
$\hat{\Gamma}$=circulation vector (positive in s direction)
$\hat{U}$=freestream velocity vector.

The change in load direction at D is consistent with the above definition for loading.

This distribution shown above is one of a family whose limits are defined by vertical translation of the basic loading curve in the manner given by the dotted lines. From a practical standpoint however, the limits are restricted to the following:

$$.30/.70) \frac{\ell_{11}}{\ell_{12}}).70/.30$$

Any curved of the above family will produce the same drag benefit but not the same spanwise load and bending moment distribution.

Figure 6:
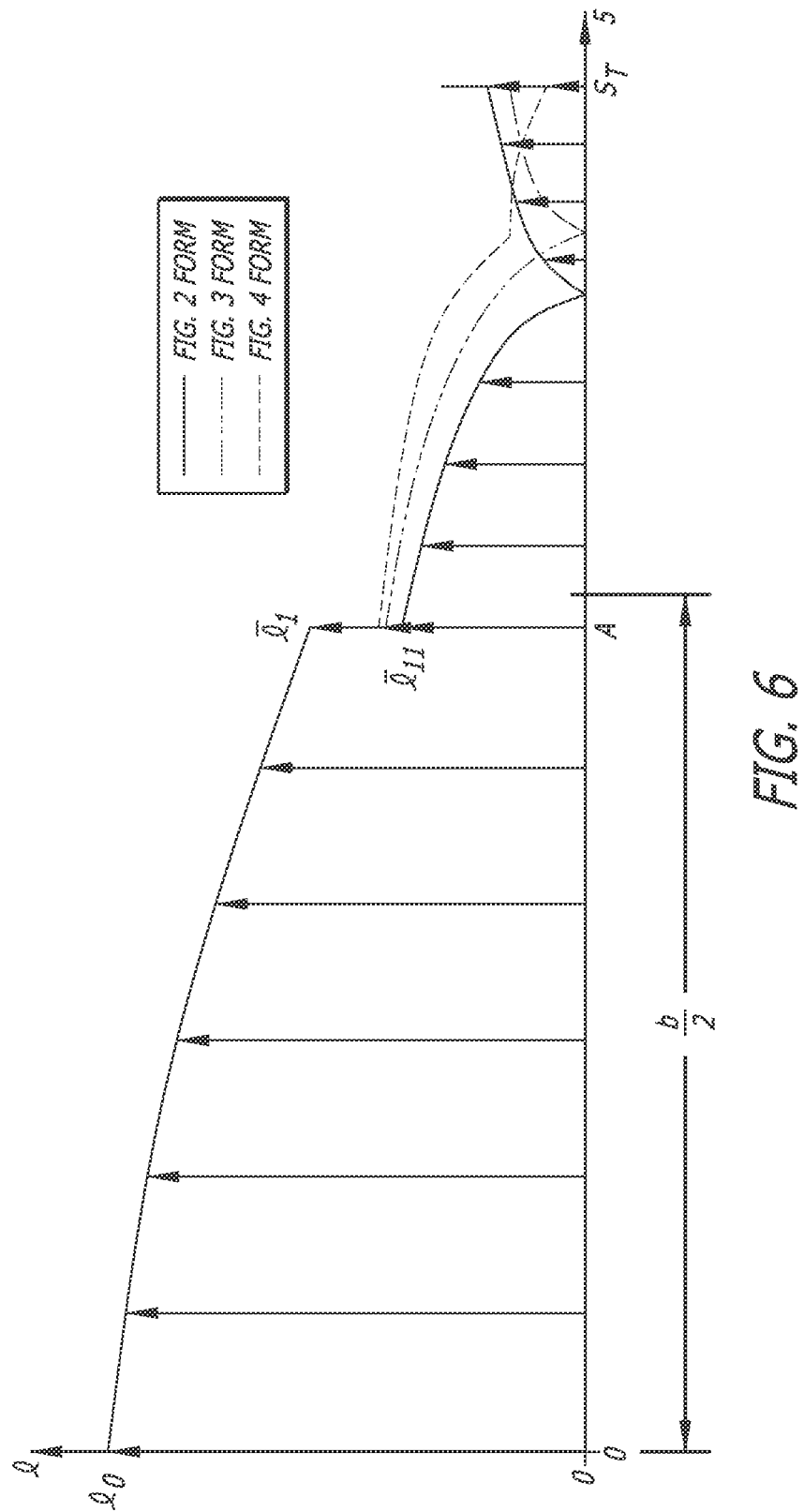
FIG. 6 illustrates a comparison of exemplary loading characteristics for the split-split-spiroid wing tip of FIGS. 2A-4C.

FIG. 6 illustrates an exemplary aerodynamic loading comparison between the split-spiroids of FIGS. 2-5. The loading for the basic spiroid form of FIG. 2 is optimized to provide maximum drag reduction. The FIG. 3 form is similar to the FIG. 2 form, but may be tailored to minimize wave drag or weight, for example. The FIG. 4 form emphasizes producing counter-torque so the loading will reflect this requirement. Since the loading will not be optimum, the drag benefit will be reduced by a predictable amount. This, as determined by the tradeoff process should be extended to include the entire aircraft configuration. Ideally, the extended tradeoff process should be used in all cases. However, in practice, the use of the sub-optimized basic form is usually satisfactory and avoids expensive and time consuming effort to arrive at a design.

While the invention has been described in terms of particular variations and illustrative figures, those of ordinary skill in the art will recognize that the invention is not limited to the variations or figures described. In addition, where methods and steps described above indicate certain events occurring in certain order, those of ordinary skill in the art will recognize that the ordering of certain steps may be modified and that such modifications are in accordance with the variations of the invention. Additionally, certain of the steps may be performed concurrently in a parallel process when possible, as well as performed sequentially as described above. Therefore, to the extent there are variations of the invention, which are within the spirit of the disclosure or equivalent to the inventions found in the claims, it is the intent that this patent will cover those variations as well. The terms attaching and connecting are used herein interchangeably to indicate either a direct or indirect coupling between the described structures. Embodiments as described herein generally relate to tips for an airplane wing. However, the invention is not so limited and may be used in any craft with a wing-like structure where drag incurred by the wing-tip vortices presents issues.

What is claimed is:

1. A spiroid wing tip designed for attachment to an aircraft wing having an aircraft wing leading edge and an aircraft wing trailing edge, the spiroid wing tip comprising:
    an enclosed loop, comprising:
        a beginning section including a leading edge generally continuous with the aircraft wing leading edge;
        an ending section having a trailing edge swept rearward with respect to the aircraft wing trailing edge; and
        middle section between the beginning section and the ending section, the middle section including a portion extending above a chord plane of the aircraft wing.

2. The spiroid wing tip according to claim 1, wherein the ending section trailing edge is generally continuous with the aircraft wing trailing edge.

3. The spiroid wing tip according to claim 1, wherein the middle section is swept rearward with respect to the aircraft wing trailing edge.

4. The spiroid wing tip according to claim 1, wherein the middle section includes a portion extending below the chord plane of the aircraft wing.

5. The spiroid wing tip according to claim 1, wherein the beginning section extends from the aircraft wing in the chord plane thereof.

6. The spiroid wing tip according to claim 1, wherein the beginning section tapers from a first chord length at an aircraft wing attachment section to a second chord length smaller than the first chord length remote from the aircraft wing attachment section.

7. The spiroid wing tip according to claim 6, wherein the middle section tapers from the second chord length to a third chord length smaller than the second chord length.

8. The spiroid wing tip according to claim 7, wherein the ending section has an increasing chord length in a direction toward the aircraft wing.

9. The spiroid wing tip according to claim 1, wherein the middle section includes a first section connected to the beginning section and a second section connected to the ending section.

10. The spiroid wing tip according to claim 1, wherein each of the beginning section, ending section, and middle section are generally planar.

11. The spiroid wing tip according to claim 1, wherein the beginning section extends below the chord plane of the aircraft wing.

12. The spiroid wing tip according to claim 11, wherein the middle section traverses the chord plane of the aircraft wing.

13. The spiroid wing tip according to claim 1, wherein the middle section extends a distance $h_1$ above the chord plane of the aircraft wing and a distance $h_2$ below the chord plane of the aircraft wing, wherein the ratio of $h_2/h_1$ is between approximately 0.4 and 1.0.

14. The spiroid wing tip according to claim 1, wherein the enclosed loop has a horizontal width of w and a vertical height of h, wherein the ratio of w/h is approximately 1.0.

15. The spiroid wing tip according to claim 1, wherein a y-axis along an aircraft wing attachment section in the chord plane of the aircraft wing originates at the aircraft wing leading edge and extends toward the aircraft wing trailing edge, wherein an x-axis orthogonal to the y-axis is in the chord plane of the aircraft wing, and wherein a z-axis is orthogonal to both the y-axis and the x-axis, the beginning section extending from the aircraft wing attachment section in a positive x direction and a negative z direction, the ending section extending from the aircraft wing attachment section in the positive x direction and a positive z direction.

16. The spiroid wing tip according to claim 15, wherein the middle section includes a first part and a third part generally parallel to an x-y plane and a second part between the first and third parts orthogonal to the x-y plane.

17. The spiroid wing tip according to claim 1, wherein a portion of the ending section overlaps a portion of the beginning section.

* * * * *